Feb. 1, 1955　　　　　S. LISTON　　　　　2,700,939
AUTOMATIC MEANS FOR THE MAKING AND
BAKING OF BAKERY PRODUCTS
Filed July 16, 1952　　　　　　　　　3 Sheets-Sheet 2

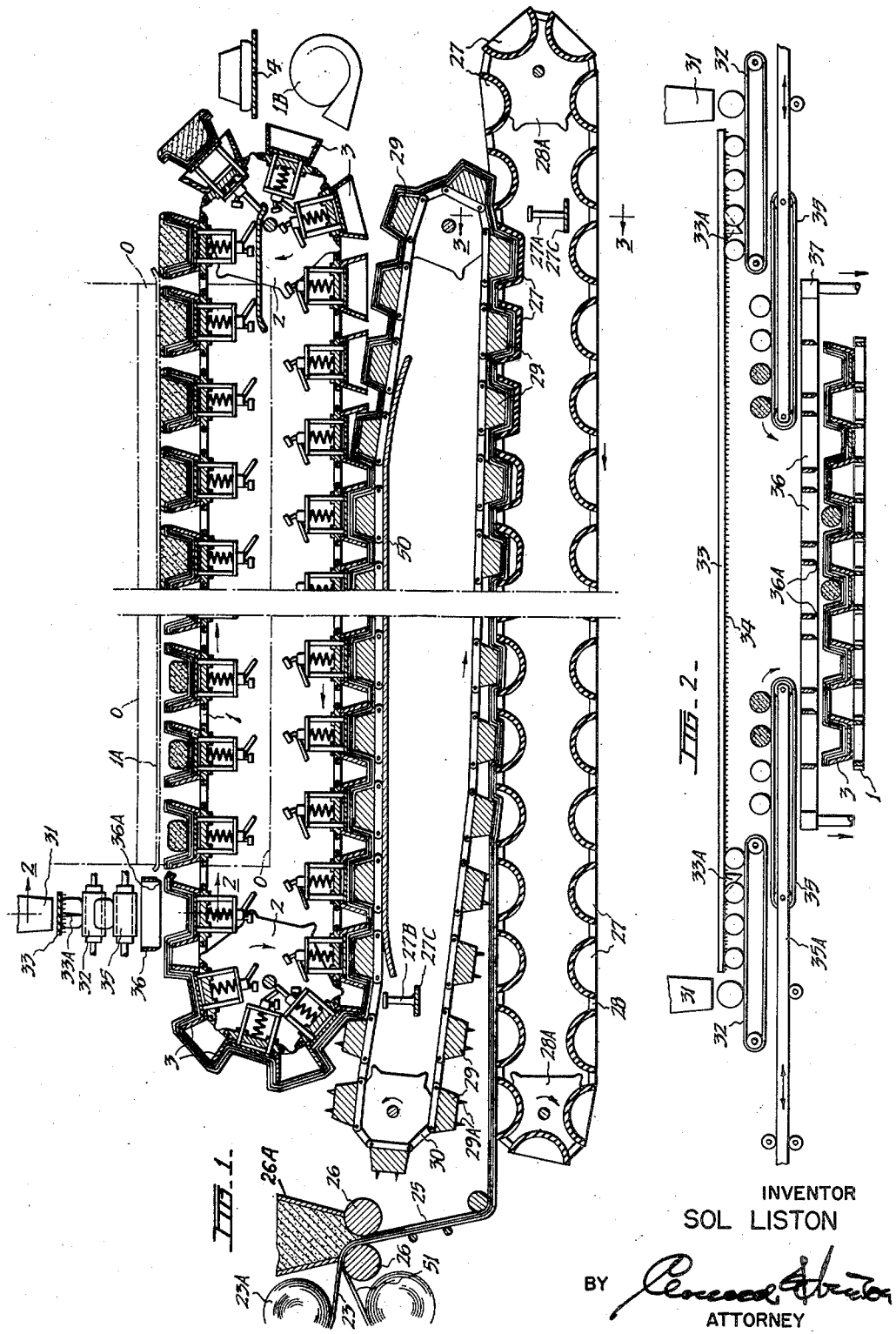

INVENTOR
SOL LISTON
BY
ATTORNEY

Feb. 1, 1955  S. LISTON  2,700,939
AUTOMATIC MEANS FOR THE MAKING AND
BAKING OF BAKERY PRODUCTS
Filed July 16, 1952  3 Sheets-Sheet 3

INVENTOR
SOL LISTON
BY
ATTORNEY

United States Patent Office 2,700,939
Patented Feb. 1, 1955

2,700,939

AUTOMATIC MEANS FOR THE MAKING AND BAKING OF BAKERY PRODUCTS

Sol Liston, St. Kilda, Melbourne, Victoria, Australia

Application July 16, 1952, Serial No. 299,120

10 Claims. (Cl. 107—1)

This invention relates to automatic means for carrying out various operations in the making and baking of bread, block cakes, rolls, pies, or the like. The term "loaf" is used herein to include the various types of pan-baked bread, block cakes and the like, and also, as mentioned hereunder, to include certain types of rolls and other loaves which normally are not pan-baked. The term "pie" is used to include any product having a casing crust and a filling of meat or other edible material. The term "bakery products" is used to include both loaves and pies. The terms "making" and "baking" are used to include associated operations—as, for example, moulding, coating, or depanning. This invention also relates to means for enclosing loaves and pies in a protective casing.

One object of this invention is to provide automatic mechanism for coating loaves with a special outer edible layer, or for forming the bodies of pie casings.

A second object is to provide automatic mechanism for placing an outer layer of paper on loaves or pies.

A third object is to provide automatic mechanism for enclosing loaves or pies with a protective casing of plastic.

Figure 3:
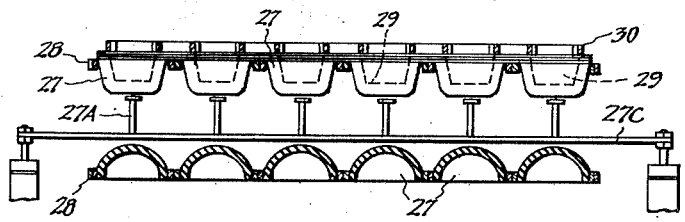
Figure 4:
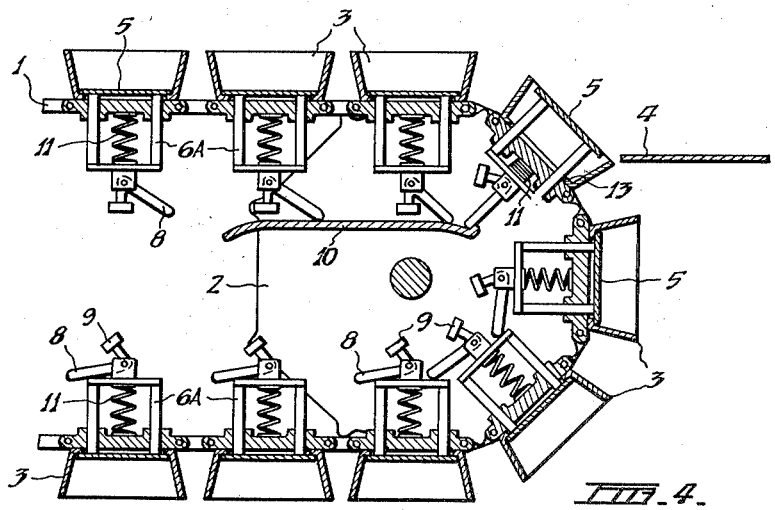
Figure 5:
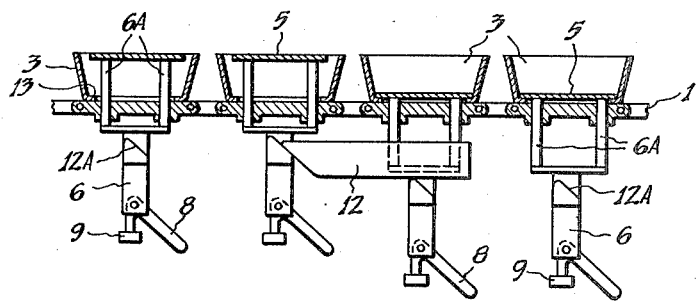
Figure 6:
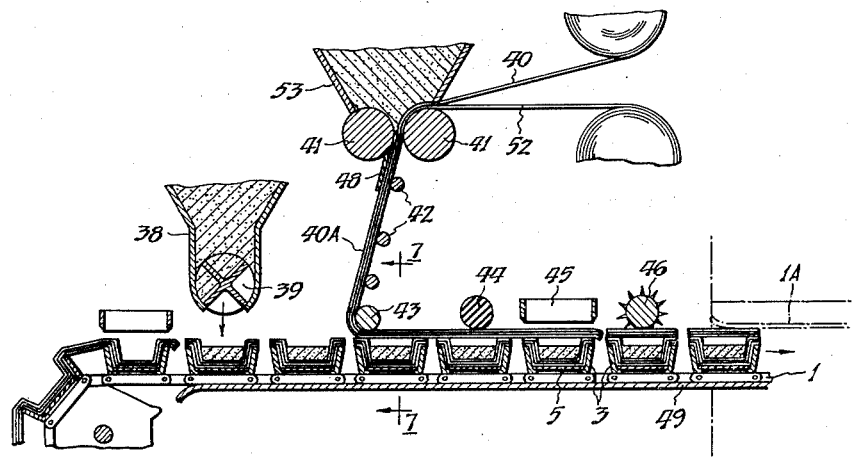
Figure 7:
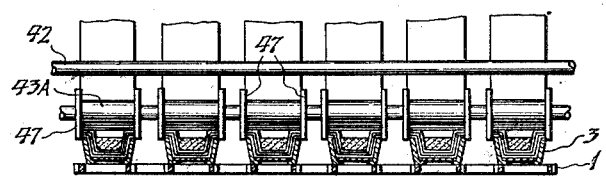
Figure 8:
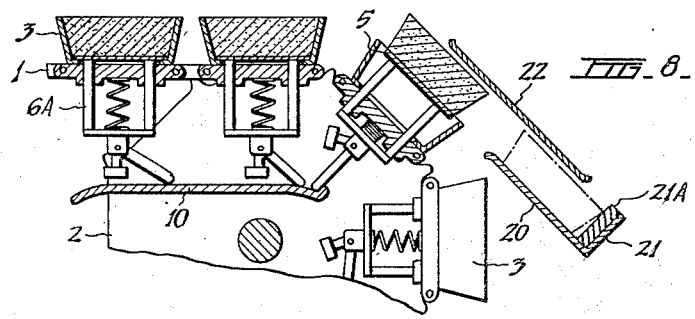

I attain these objects by mechanism illustrated in the accompanying drawings, in which Figure 1 is a somewhat diagrammatic side elevation of conveyors and associated mechanism for the making and baking of bakery products, driving means and like details of known construction being omitted for clearness of illustration; Figure 2 is a somewhat diagrammatic end elevation of means for forming and feeding dough loaves to the pans after applying a lining layer to said pans; Figure 3 is an end elevation of portion of the mechanism showing lifting means to assist the transfer of pan-lining material from moulds to dies and from dies to pans; Figure 4 is a side elevation of portion of a pan-conveyor and improved de-panning means; Figure 5 is a side elevation of portion of a pan-conveyor and means for returning loose bottoms of the pans to their lowered position; Figure 6 is a side elevation of portion of a pan-conveyor, with a somewhat diagrammatic view of means for supplying pie-fillings or the like to the pans and means for covering the filled pans with a composite covering layer; Figure 7 is a rear elevation of means for supplying a covering layer to the pans in separate parallel strips, and Figure 8 is a side elevation of de-panning means and shows a cross-conveyor and means for transferring pies from the pans to said cross-conveyor.

The mechanism hereinafter described with reference to these drawings may be used to coat loaves with an outer layer having special qualities by lining the baking pans with a layer of dough of such a character that it will improve the nutritive, appetizing or keeping quality of the crust or several of those qualities.

In a similar manner a layer may be formed in each baking pan to constitute the body of a pie casing (i. e. pie crust). Similarly with this mechanism a layer of paper may be arranged as a lining for each baking pan and as a protection for the resultant loaves or pies. In the case of pies and also in the case of loaves an edible top layer may be supplied to complete the encasing of the pie filling with crust or the covering of the loaf. Also a protective paper casing may be completed similarly. In some instances, as in the case of army supplies and the like, it is desirable to keep loaves for a considerably longer time than normally; that may be achieved very simply by supplying to each baking pan an outer layer of protein plastic and a covering layer of the same material so that each loaf is enclosed in a protective casing of hardened plastic. This plastic casing may also be applied to pies.

The manner of achieving these various objectives of the mechanism will now be described.

In the mechanism shown in Figures 1 and 2 for lining, moulding (in the case of loaves), and filling, a sheet of paper 23 from a roll 23A carries a layer of dough or paste 25 from a hopper 26A and a pair of rollers 26 or like means over a series of moulds 27. This series may comprise several parallel longitudinal rows of moulds. The paper sheet and the layer of dough or paste may either extend over the whole of the moulds 27 or a separate strip of each may be provided for each longitudinal row of moulds. This latter could be effected, for example, by means similar to those subsequently described in relation to Figure 7 for supplying covering strips to the lined and filled pans. The moulds 27 are carried by a mould-conveyor 28 and they are formed of rubber or other flexible material and co-operate with dies 29. These are carried by a die-conveyor 30. When a die presses a layer of paper and an upper layer of dough or paste down into a mould, the latter, owing to its flexibility, conforms to the shape of the die and the dough or paste is thus pressed into a layer of the desired thickness between the paper and the die. The die-conveyor is an endless conveyor and the mould-conveyor is also an endless one. When the die-conveyor reaches the position where it commences to move upwardly it draws the dies out of the moulds with the dough or paste adhering to the dies, and preferably this adherence of the dough to the dies is enhanced by the provision of short tapered spikes 29A or the like on the lower face of each die. The dies carrying the layer of dough or paste encased in the layer of paper move upwardly and, during their upper return movement, the conveyor follows a path which forces the dies into the cavities of baking pans 3 at a stage where they are carried in an inverted position by a synchronously moving superposed pan-conveyor 1 which is returning these pans from the baking oven after the baked loaves or pies have been de-panned. The lining of dough or paste has now reached a stage where pre-baking of a crust or pie-casing is commencing. The pans are thus lined with paper and with an inner layer of crust or pie-casing and ultimately are carried upwardly by their conveyor so that the dies move out of the lined pans and the latter move to a filling position.

The mould-conveyor, die-conveyor and pan-conveyor are driven with an interrupted movement so that operations subsequently described, such as the filling and trimming of the linings, for example, can be effected while the pans are stationary.

As the pans on leaving the oven may be hotter than is desirable for the pre-baking stage, a fan 1B may direct a stream of cold air on to the pans at that stage.

To facilitate the transference of the paper and dough or paste lining from the moulds to the dies, it is desirable for the mould-conveyor to be so carried by sprocket wheels 28A or the like that its upper portion is drawn upwardly at its delivery end. The engagement of the dies and moulds makes this upward bending of the mould-conveyor possible. Similarly the die-conveyor should be turned upwardly at its delivery end to facilitate the transference of the paper and dough-lining from the dies to the pans. This transference of the linings is also facilitated by pushers 27A, 27B which are carried by a cross-bar 27C (Figures 1 and 3) and are moved vertically by cam-actuated or other means (not shown) when the conveyors are stationary so that the layer of dough and/or the paper is pressed upwardly by these pushers between adjacent dies 29, thus facilitating the transference of the dough and/or paper from the moulds 27 to the dies 29 and from the latter to the pans 3.

In the specification of my patent application, Serial No. 224,879, filed May 7, 1951, now Patent No. 2,652,791, dated September 22, 1953, means is disclosed for the automatic baking and de-panning of loaves. Such means comprises an endless conveyor to which pans are attached, and these pans are provided with loose bottoms and with means for raising these loose bottoms in the pans at an appropriate point in the travel of the pans so as to facilitate the de-panning of the loaves when the pans are turned over as they pass downwardly on the conveyor. Similar means could be used as a component part of the present mechanism but in the specific construction shown in the accompanying drawings the member carrying the loose bottom of each pan is of an improved construction and means is provided to ensure with more certainty the return of the loose bottom from its loaf de-panning to its dough-loaf receiving position in the pan.

The conveyor 1 is carried by rotatable sprocket wheels 2, one or both of which may be driven by any suitable form of driving mechanism (not shown). The pans 3 are attached to the endless conveyor so that they are carried thereby through the oven (indicated by chain dotted lines O in Figure 1) after having passed all stages in the making of loaves and are returned, while suspended from the conveyor, to the front of the oven where they pass up into an upright position for re-charging. When the conveyor discharges at the rear of the oven it will normally do so on to a cross conveyor which carries the loaves automatically to a suitable delivery point. The cross conveyor is indicated diagrammatically at 4. Any suitable means (not shown) may be provided for closing the pans if it is desired to bake the loaves in closed pans; for example, the pans during the baking may pass along beneath a fixed cover plate 1A as indicated in Figure 1. The plate 1A, of course, could be made up of several separate portions. The cover plate thus acts as an automatic lidding and de-lidding means for the pans. The pans are suitably spaced and each pan is provided with a loose bottom 5 and means is provided to raise this bottom automatically at a point in the travel of the conveyor represented by the right hand portion of Figure 1, where the loaves have been baked to the required degree. After raising the loose bottoms, the loaves are tipped automatically out of the pans on to the cross conveyor 4. Clips or other means (not shown) are provided to connect the pans to the conveyor so that they will be suspended from the conveyor when it passes down and under and so that they will not otherwise be displaced— as, for example, when the bottoms of the pans are being raised as above-mentioned. The pans may be formed of metal and/or solid plastic, laminated metal compounds, or alloys. Each loose bottom is carried by a plunger 6 which is slidable through a boss on the conveyor and is provided with a lifter arm 8 which is pivoted to the lower end of the plunger and which is provided with a counterweight 9. This counter-weight causes the lifter arm to extend forwardly when the pan in question is travelling along the upper portion of its path. When a trip member 10, provided near the end of the upper path, engages the lifter arm the plunger 6 is raised and thus lifts the loose bottom and loosens the loaf from the pan so that, either then or at a slightly later stage in the travel of the conveyor, the loaf is discharged. All this de-panning mechanism forms a part of the invention forming the subject of my prior patent application above-mentioned, but the plunger 6 according to my present invention, instead of being connected directly to the loose bottom 5 as in my prior patent application, carries two arms 6A, which are connected to the loose bottom, and means is provided to facilitate the return of the loose bottoms after they have been raised. Such means may comprise springs 11 arranged as shown or, alternatively, may comprise a stationary wedge-like member 12 co-acting with an inclined shoulder 12A provided on the plunger 6. When the pans have been carried through their return path and have been brought back into an upright position the plungers and loose bottoms fall back (with the assistance of the springs 11 or of the co-acting members 12 and 12A) into their normal position.

When this pan-conveyor and its de-panning means are used in connection with the baking of pies, as herein specified, it would not normally be suitable to tip the pies out of the pans directly onto a horizontal cross-conveyor, as the pies would tend to be damaged by that treatment. Consequently, in the case of pies, an inclined cross-conveyor 20 (Figure 8) may be provided. This should have pie-retaining means—as, for example, an outer flange 21 cushioned with rubber or like soft material 21A. To guide the pies and to prevent them from tipping over as they slide from the raised bottoms of the pans to the inclined cross-conveyor, fixed guide-plates 22 may extend across the width of the pan-conveyor.

Means is provided for filling the lined pans with moulded dough loaves, or in the case of pies, with one of the customary fillings. In the case of loaves this filling is effected by providing above the pan-conveyor on each side proving and dividing means 31 of any suitable known construction which deliver measured portions of proofed dough to conveyors 32 which carry them along under a fixed dough-rolling board 33 which may be provided with spikes 34. The dough is thus rolled into cylindrical form, normally with somewhat rounded ends. A conveyor 35 carried by a reciprocating support 35A is provided beneath each conveyor 32 so that these reciprocating conveyors carry the dough loaves inwardly from the edges of the pan-conveyor. The lateral reciprocating movement of the reciprocating conveyors in relation to the pan-carrying conveyor is such that dough loaves are supplied in one traverse to the two innermost pans first of all and then as the conveyors are carried outwardly the next dough loaves pass into the two next pans and so on until the two outermost pans are fed. In the next traverse the sequence of feeding is reversed. The pan-conveyor has an interrupted motion, as hereinbefore mentioned, and remains stationary during each filling stage. The driving means for the conveyors 32 and 35 are not shown on the drawings. A chain and sprocket drive would be suitable. The delivery of the dough loaves to the pans is not effected directly from the two conveyors but through the medium of a series of short chutes 36 which are carried by a bridge member 37 so that a short chute is positioned above each pan. When a row of pans has been filled it is necessary to sever the dough and/or paper linings of the pans from the intervening dough and paper and that is achieved by providing the short chutes, carried by the bridge member, with lower cutting edges 36A which co-operate with the outer edges of the pans to sever the dough and paper while the pans are stationary. As hereinbefore mentioned, preferably, the pan-conveyor is of open construction so that the intervening portions severed from the partly baked dough lining and the paper lining fall through the conveyor onto a trimmings conveyor or into a pit or other catchment means. Deflectors, wipers, or like devices (not shown) may also be provided at appropriate places to facilitate this removal of waste trimmings. The tunnel (not shown) through which the conveyors pass externally of the oven will normally be kept at such a temperature that pre-baking of the dough or paste of the pan-lining layer commences when it enters the pans so that the trimmings are normally partly baked.

This invention thus enables the loaves to be baked with a crust having special characteristics, and also enables the loaves to be baked in paper casings, but, as above-mentioned, the mechanism can be used either with the paper alone or with the dough layer alone. The paper layer not only forms a protective casing for the lower portion of the loaf but also facilitates the subsequent de-panning of the baked loaf. In order to enable the paper to be pressed adequately into shape between the dies and flexible moulds a crinkled paper which is capable of extension longitudinally and laterally is used. If paper is not used the pans should be greased.

The pans which receive the dough loaves may be replaced by pans of shorter length (when viewed laterally across the pan conveyor) or pans may be divided into smaller pans by cross-partitions. If so, a single dough-feeding mechanism may be used to supply several pans by providing stationary cutters 33A, which may be carried by the dough-rolling board 33 for example. These cutters sever the dough loaves into shorter lengths.

As above-mentioned, the pan-conveyor may be arranged to carry the loaves through a proving chamber and, if desired, through other stages in the making of loaves (as, for example, past means for top-slashing and/or sprinkling with granular material) before carrying them through the baking ovens and de-panning and delivering them. Consequently, the whole of the operations of making and baking of the loaves, from the feeding of the paper and dough-lining sheets to the delivery of the baked loaves, may be carried out automatically.

Again as above-mentioned, pie casings or the like could be formed with this mechanism, and the filling means instead of supplying pieces of dough to the lined pans could be used to supply some other form of filling. Suitable pie-filling means is shown in Figure 6. This pie-filling means comprises a hopper 38 and star valve 39 positioned above each pan in a lateral row. The hopper is fed with suitably minced or broken up meat and gravy from any suitable means—as, for example, a trough (not shown) extending across above a series of hoppers 38 disposed laterally across and above the conveyor 1. Each star valve is rotated during each resting period of the pan-conveyor by driving means (not shown), so that the pans are filled successively as they reach the position of the hoppers. The covering of the pies, or the covering of the loaves if desired, may be effected by the mechanism shown in Figures 6 and 7. A sheet of paper 40 running between a pair of rollers 41 carries a layer of paste or dough 40A, from a hopper 53, over idle rollers 42, 43 and is turned forward around the roller 43 to bring the paste or dough layer, with the papers superposed, over the pans. The forward movement of the pans draws this composite cover layer forward. A roller or laterally extending series of rollers 44 presses the cover layer down against the top edge of the lining. Cutters 45 shaped to the contour of the pan are moved down (by means not shown) to trim the paper and paste or dough around the edges of each pan during a period of rest of the intermittently moving pan-conveyor. The paste or like linings may be perforated by a spiked roller or the like (not shown) prior to or after being positioned in the pans and the paper may also be perforated as well as pleated. The pans may also be perforated. The cover layer of pies will normally be perforated by a spiked roller 46 to facilitate the escape of steam.

Instead of feeding a wide sheet of paper, with a layer of paste or dough, extending over the full width of a lateral row of pans, a separate strip of paper, and of paste or dough, could be fed to each longitudinal row of pans at a corresponding position in their path of travel, as shown in Figure 7. In this case, the lower roller or lower rollers 43A preferably are provided with guide flanges 47 to locate the composite cover layer accurately in relation to the pans.

If desired scrapers (not shown in Figure 7) may be provided to insure that paste or dough does not adhere unduly to the flanges or rollers and thus cause clogging or other interference with the efficient operation of the mechanism. In Figure 6 a scraper 48 is shown. The function of this scraper is to prevent undue adherence of paste or dough to the exposed roller of the pair of rollers 41.

The cover plate 1A protects the paper covering and the pies from burning. It should be perforated to allow escape of steam.

To prevent sagging of the pan-conveyor, laterally spaced longitudinal supporting run-ways 49 (Figure 6) should be provided. These should be so positioned that they do not foul the de-panning mechanism. For the sake of clearness they are omitted from Figure 1. The runways or the conveyors may be provided with short anti-friction rollers if desired. Similar run-ways 50 (Figure 1) may be provided for the die-conveyor.

Normally the temperature of the tunnel through which the lined pans pass before reaching the oven will be controlled so that a predetermined temperature (such as 320° F., for example) is maintained throughout or so that they pass through a series of compartments with a predetermined temperature gradient.

The mechanism according to this invention, can also be used, with slight additional mechanism, to form protective casings (other than paper coverings) for the loaves or pies. This is achieved by providing means for feeding a layer of protein plastic into the pans below the other lining layer or layers, and by providing means for feeding a covering layer of protein plastic to the pans after the filling of the pans, and after like operations such as the covering of pies, have been completed.

With the mechanism, according to this invention, this feeding of a lower and upper layer of protein plastic to the pans is a very simple matter. In Figure 1 a layer of protein plastic 51 is shown being fed in between the rollers 26 and passing through the hopper of the filling mechanism below the paper 23. In Figure 6 an upper layer of protein plastic 52 is shown being fed through the hopper 53 and between the rollers 41 so that eventually it lies above the paper layer 40. The protein plastic is preferably supplied to each longitudinal row of pans separately. In other words a series of feeders feeds a series of ribbons of protein plastic to the parallel longitudinal rows of pans. When the cutter 45 trims off the portions of the various layers which extend beyond the edges of the pans, the lower and upper layers of protein plastic are brought together so that they form a complete or virtually complete casing for the loaf or pie. Pressing means (not shown) could also be provided to squeeze said upper and lower layers firmly together. Consequently, when the loaf or pie has been baked it is covered with a protective casing of protein plastic which keeps the loaf or pie in good condition for much longer than would otherwise be the case and also forms an hygienic covering for the loaf or pie. If a pie is thus protected by a casing of protein plastic, the de-panning of the pie may be effected without the necessity for the means shown in Figure 8, which is designed to prevent the turning over of the pies during their delivery from the pan-conveyor 1 to the cross-conveyor 20. In other words, the turning over of the pies when they are encased will not damage the pies as it would if they were not protected by this casing. The protein plastic may be casein, for example. Obviously, no plastic could be used which would be liable, from its nature, to damage the food contents of the casing.

The means for pressing down the covers on to the pies and/or loaves will not be provided with a spiked roller 46 if a covering layer of protein plastic is to be applied. Similarly, the dies would not be provided with spikes 29A or, alternatively, the spikes 29A would be made so short that they would not penetrate the layer of protein plastic.

From the foregoing description it will be seen that the invention is adapted for use in a continuous closed circuit of moulding, panning, coating, covering, final proving, lidding, baking, de-lidding, de-panning, and delivering.

To provide for varying the sizes of loaves, the pans need not be all of the same size; for example, if there are a number of longitudinal rows of pans parallel to each other, the pans in one or more of these longitudinal rows may be of different size from those in some other row or rows. Also, it is of course possible at any time to replace some or all of the pans by pans of a different size. The shapes of the pans may also vary; for example, some of the pans may be shallow curved pans, instead of being of the somewhat deeper normal shape.

I claim.

1. The combination, in automatic means for the making and baking of bakery products, of an endless pan-conveyor, baking pans attached to said pan-conveyor, means including a conveyor and dies carried thereon and disposed beneath said first conveyor to enter the baking pans for supplying a lining material to said pans, and means for filling said pans when thus lined.

2. The combination claimed in claim 1 for use in the making and baking of bakery products, in which the lining material is formed of paper, and means on said dies for engaging and drawing said paper from a roll thereof.

3. The combination claimed in claim 1 for use in the making and baking of bakery products, in which the lining material is formed of an inner layer of edible material and an outer layer of paper, said lining-supplying means including a hopper containing edible material and adapted to deposit the edible material in a continuous layer on said paper layer, said paper layer being supported on a roll, and a pair of rollers adjacent said hopper and said roll between which said layers of edible material and paper are drawn.

4. The combination claimed in claim 1 for use in the making and baking of bakery products, in which the lining material is formed of an outer layer of protein plastic and an inner layer of edible material, said lining-supplying means including a hopper containing edible material and adapted to deposit the edible material in a continuous layer adjacent to and supported by said protein plastic layer, said protein plastic layer being supported on a roll, and a pair of rollers at the discharge end of said hopper and adjacent said roll between which said layers of edible material and protein plastic are drawn.

5. The combination claimed in claim 1 for use in the making and baking of bakery products, in which the lining material is formed of an outer layer of protein plastic, an intermediate layer of paper and an inner layer of edible material, said lining-supplying means including a hopper containing edible material and adapted to deposit the edible material in a continuous layer on said paper layer, said paper layer being supported on a roll, said protein plastic layer being supported on a second roll adjacent said first roll, and a pair of rollers adjacent said hopper and said rolls between which said layers of edible material, paper, and protein plastic are drawn.

6. The combination, in automatic means for use in the making and baking of bakery products, of a mould-conveyor, flexible moulds carried by said mould-conveyor, means for feeding lining material to said flexible moulds, a die-conveyor disposed above said mould conveyor, dies carried by said die-conveyor and adapted to co-operate with said moulds to press said lining material into the shape of said dies and to remove the shaped lining material from said moulds, a pan-conveyor disposed above said die conveyor, an oven disposed above said pan conveyor through which said pan-conveyor passes, pans attached to said pan-conveyor and adapted when hanging from said pan-conveyor in inverted position on the return movement of said pan-conveyor from said oven to receive said lining material from said dies, means for filling said pans when they have thus received said lining material, means for trimming off the portions of said lining material extending beyond the edges of said pans, depanning means provided in conjunction with said pans, and means receiving the baked products from said pans and delivering said baked products to a collecting position.

7. In the combination for making and baking of bakery products claimed in claim 6, means for supplying measured quantities of dough, a dough-rolling conveyor to which said measured quantities of dough are supplied, a dough-rolling board above said dough-rolling conveyor, said dough-rolling conveyor being adapted to shape said dough into dough loaves by rolling it beneath said dough-rolling board, dough-loaf transferring conveyors positioned to receive said shaped dough loaves, from said dough-rolling conveyor, reciprocating means carrying said dough-loaf transferring conveyors inwardly and outwardly above the pan-conveyor, and means receiving said shaped dough loaves from said dough-loaf transferring conveyors and directing them into the pans.

8. In the combination for making and baking of bakery products claimed in claim 6, pusher means adapted to assist the transfer of the lining material from the flexible moulds to the dies, and pusher means adapted to assist the transfer of the lining material from the dies to the pans.

9. In the combination for the making and baking of bakery products claimed in claim 6, means supplying a covering layer to said pans, means comprising cutters conforming to the edges of said pans adapted to trim off the portions of said covering layer extending beyond the edges of said pans, and means comprising rollers adapted to press such covering layer into close contact with the upper edges of the lining material in said pans.

10. In the combination for the making and baking of bakery products claimed in claim 6, means adapted to supply a composite covering layer to the pans, an outer plastic component layer in said composite layer, means comprising cutters conforming to the edges of said pans adapted to trim off the portions of said composite covering layer extending beyond the edges of said pans, and means comprising rollers adapted to press the covering layer into close contact with the upper edges of the lining material in the pans.

References Cited in the file of this patent

UNITED STATES PATENTS

| Number | Name | Date |
|---|---|---|
| 558,675 | Dean et al. | Apr. 21, 1896 |
| 1,130,568 | Callow | Mar. 2, 1915 |
| 1,162,751 | Clinton | Dec. 7, 1915 |
| 1,434,035 | Ballard | Oct. 31, 1922 |
| 1,481,866 | Heist | Jan. 29, 1924 |
| 1,492,510 | De Escobales | Apr. 29, 1924 |
| 2,405,661 | McManus | Aug. 13, 1946 |
| 2,494,236 | Goldstein | Jan. 10, 1950 |